(12) United States Patent
Choi et al.

(10) Patent No.: US 8,393,637 B2
(45) Date of Patent: Mar. 12, 2013

(54) AIRBAG APPARATUS FOR VEHICLE

(75) Inventors: Jun Yeol Choi, Seoul (KR); Wan Dong Yoo, Suwon-si (KR); Jae Man Go, Osan-si (KR)

(73) Assignees: Hyundai Motor Company, Seoul (KR); Kia Motors Corp., Seoul (KR); Autoliv Development AB, Vargarda (SE)

( * ) Notice: Subject to any disclaimer, the term of this patent is extended or adjusted under 35 U.S.C. 154(b) by 103 days.

(21) Appl. No.: 12/956,309

(22) Filed: Nov. 30, 2010

(65) Prior Publication Data

US 2012/0049492 A1 Mar. 1, 2012

(30) Foreign Application Priority Data

Aug. 30, 2010 (KR) .................. 10-2010-0083881

(51) Int. Cl.
*B60R 21/214* (2011.01)
*B60R 21/2338* (2011.01)

(52) U.S. Cl. .................. 280/730.1; 280/742; 280/743.2

(58) Field of Classification Search .............. 280/730.1, 280/740, 742, 743.1, 743.2; B60R 21/214, B60R 21/231, 21/2334, 21/2338
See application file for complete search history.

(56) References Cited

U.S. PATENT DOCUMENTS

| | | | | |
|---|---|---|---|---|
| 5,934,701 A * | 8/1999 | Furukawa | .................. | 280/730.1 |
| 6,283,500 B1 * | 9/2001 | Eckert et al. | ................. | 280/730.1 |
| 6,419,262 B1 * | 7/2002 | Fendt et al. | .................... | 280/729 |
| 6,431,599 B1 * | 8/2002 | Bohn | ......................... | 280/743.1 |
| 6,460,878 B2 * | 10/2002 | Eckert et al. | ................ | 280/730.1 |
| 6,536,800 B2 * | 3/2003 | Kumagai et al. | ............ | 280/743.1 |
| 6,722,691 B1 * | 4/2004 | Håland et al. | ............... | 280/730.1 |
| 6,817,626 B2 * | 11/2004 | Boll et al. | ................... | 280/730.1 |
| 6,834,886 B2 * | 12/2004 | Hasebe et al. | .............. | 280/743.1 |
| 6,932,380 B2 * | 8/2005 | Choi | .......................... | 280/730.1 |
| 7,025,376 B2 * | 4/2006 | Dominissini | ................. | 280/729 |
| 7,108,282 B2 * | 9/2006 | Hasebe et al. | .............. | 280/743.1 |
| 7,137,647 B2 * | 11/2006 | Adomeit | ..................... | 280/743.2 |
| 7,152,880 B1 * | 12/2006 | Pang et al. | .................. | 280/743.2 |
| 7,163,229 B2 * | 1/2007 | Hasebe et al. | .............. | 280/730.1 |
| 7,243,947 B2 * | 7/2007 | Bosch | .......................... | 280/743.1 |
| 7,360,790 B2 * | 4/2008 | Hasebe et al. | .............. | 280/743.2 |
| 7,364,188 B2 * | 4/2008 | Hasebe et al. | ................ | 280/732 |
| 7,370,880 B2 * | 5/2008 | Hasebe | .......................... | 280/729 |
| 7,455,317 B2 * | 11/2008 | Bito | .............................. | 280/732 |
| 7,458,605 B2 * | 12/2008 | Hasebe et al. | ................. | 280/729 |

(Continued)

FOREIGN PATENT DOCUMENTS

KR 10-2007-0042093 A 4/2007
KR 10-2010-0062460 A 6/2010

*Primary Examiner* — Paul N Dickson
*Assistant Examiner* — Laura Freedman
(74) *Attorney, Agent, or Firm* — Morgan, Lewis & Bockius LLP (57) ABSTRACT

An airbag apparatus for a vehicle may include an inflator, and an airbag cushion having a depressed head support portion formed in a rear portion of the airbag cushion so that when the airbag cushion may be deployed by gas supplied from the inflator, the head support portion receives a head of a passenger, and shoulder support portions protruding from lateral sides of the head support portion in a rearward direction and forming a space between the shoulder support portions to have the head support portion therebetween when the airbag cushion may be deployed, and a support tether provided in the airbag cushion and extending in a transverse direction across the shoulder support portions such that a gas path may be defined in a front portion of the airbag cushion below the support tether, the gas path guiding the gas downwards.

7 Claims, 5 Drawing Sheets

U.S. PATENT DOCUMENTS

| | | | |
|---|---|---|---|
| 7,540,534 B2 * | 6/2009 | Hasebe et al. | 280/743.1 |
| 7,547,043 B2 * | 6/2009 | Kokeguchi et al. | 280/735 |
| 7,607,683 B2 * | 10/2009 | Fischer et al. | 280/730.1 |
| 7,625,008 B2 * | 12/2009 | Pang et al. | 280/743.1 |
| 7,648,158 B2 * | 1/2010 | Hasebe | 280/729 |
| 7,654,568 B2 * | 2/2010 | Yamada | 280/743.1 |
| 7,673,901 B2 * | 3/2010 | Hanawa et al. | 280/743.1 |
| 7,695,012 B2 * | 4/2010 | Libby et al. | 280/743.1 |
| 7,806,431 B2 * | 10/2010 | Yamada et al. | 280/730.1 |
| 7,909,362 B2 * | 3/2011 | Idomoto et al. | 280/743.1 |
| 7,926,840 B1 * | 4/2011 | Choi | 280/730.1 |
| 7,934,747 B2 * | 5/2011 | Miyata | 280/729 |
| 7,946,619 B2 * | 5/2011 | Mendez | 280/743.1 |
| 8,002,309 B2 * | 8/2011 | Kim et al. | 280/729 |
| 8,070,183 B2 * | 12/2011 | Kumagai et al. | 280/743.2 |
| 8,186,715 B2 * | 5/2012 | Miyata | 280/743.2 |
| 2005/0184489 A1 * | 8/2005 | Kobayashi | 280/729 |
| 2006/0028009 A1 * | 2/2006 | Hasebe et al. | 280/743.1 |
| 2006/0082114 A1 * | 4/2006 | Heym et al. | 280/743.1 |
| 2006/0163848 A1 * | 7/2006 | Abe | 280/729 |
| 2006/0186656 A1 * | 8/2006 | Kumagai | 280/743.2 |
| 2009/0295135 A1 * | 12/2009 | Kumagai et al. | 280/743.1 |
| 2010/0102542 A1 * | 4/2010 | Nakajima et al. | 280/743.2 |
| 2010/0133797 A1 * | 6/2010 | Kim et al. | 280/743.2 |

* cited by examiner

AIRBAG APPARATUS FOR VEHICLE

CROSS-REFERENCE TO RELATED APPLICATIONS

The present application claims priority to Korean Patent Application No. 10-2010-0083881 filed on Aug. 30, 2010, the entire contents of which is incorporated herein for all purposes by this reference.

BACKGROUND OF THE INVENTION

1. Field of the Invention

The present invention relates generally to airbag apparatuses for vehicles and, more particularly, to an airbag apparatus which is installed in a roof of a vehicle so that when a vehicle collision occurs, an airbag is deployed to protect a passenger.

2. Description of Related Art

Hitherto, development of airbag apparatuses for vehicles has been focused on protecting front seat passengers.

However, when a vehicle is involved in a frontal collision, a rear seat passenger that is not wearing a safety belt may injure his/her head as a result of colliding with the head of a passenger in the front seat or with the back of the front seat. Taking into account the fact that the percentage of rear seat passengers who wear safety belts is much lower than that of front seat passengers, the development of airbag apparatuses that protect rear seat passengers is more aggressively required.

Figure 5:
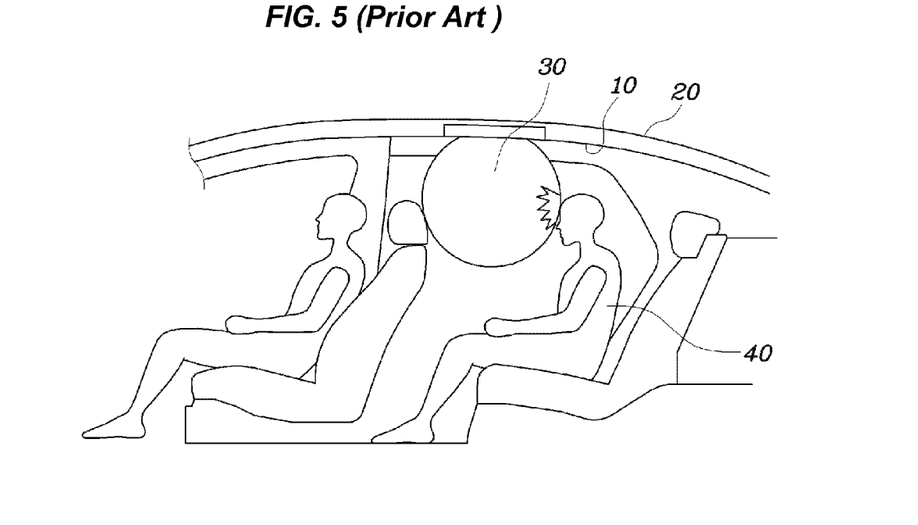
FIG. 5 is a view showing an airbag apparatus for vehicles, according to a conventional technique.

As shown in FIG. 5, in consideration of the above facts, an airbag apparatus of a vehicle for protecting a rear seat passenger was proposed. This conventional airbag apparatus is installed in space between a roof panel 10 and a headliner 20 of the vehicle. When a vehicle collision occurs, a cushion 30 tears the headliner 20, protrudes outs of the headliner 20, and then is deployed into the space between the front seat and the rear seat passenger.

However, in the conventional airbag apparatus, the cushion 30 is instantaneously inflated just in front of the face of a passenger 40. As a result, the head or neck of the passenger 40 may be injured by the cushion 30 that is inflated at high pressure.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag apparatus for a vehicle which is configured such that gas smoothly flows in an airbag cushion so that when a vehicle collision occurs, the airbag cushion can effectively protect a passenger.

In an aspect of the present invention, the airbag apparatus for a vehicle may include an inflator, and an airbag cushion having a depressed head support portion formed in a rear portion of the airbag cushion so that when the airbag cushion may be deployed by gas supplied from the inflator, the head support portion receives a head of a passenger, and shoulder support portions protruding from lateral sides of the head support portion in a rearward direction and forming a space between the shoulder support portions to have the head support portion therebetween when the airbag cushion may be deployed, and a support tether provided in the airbag cushion and extending in a transverse direction across the shoulder support portions such that a gas path may be defined in a front portion of the airbag cushion below the support tether, the gas path guiding the gas downwards.

An airbag screen may be attached to the shoulder support portions, the airbag screen covering the head support portion.

The support tether connects the head support portion and inner surface of the airbag cushion, wherein the support tether may include an upper support tether and a lower support tether spaced apart from each other by a predetermined distance in a vertical direction of the airbag cushion.

Rear and side edges of the support tether may be respectively connected to a rear surface of the head support portion and sidewalls of the airbag cushion by sewing so that the support tether encloses the head support portion, wherein a front edge of the support tether may be not connected to the inner surface of the airbag cushion and may have a round shape.

The front edge of the support tether may have a convex shape protruding along gas passage of the inflator.

The airbag apparatus may further include a housing provided in a space between a roof panel and a headliner of the vehicle, the housing containing the airbag cushion, wherein the airbag cushion may include a roof support panel supported by the headliner and receiving the gas through a gas inlet formed thereon, a vertical support panel perpendicularly connected at an upper end line thereof to a rear end line of the roof support panel, a ramp support panel connecting a front end line of the roof support panel to a lower end line of the vertical support panel at an inclined angle, and side support panels connecting side edge lines of the roof support panel, the vertical support panel, the ramp support panel, and the support tether.

The present invention has the following effects.

First, gas can smoothly flow in the front portion of an airbag cushion. Therefore, the time it takes the airbag cushion to be completely deployed is shortened, which makes the deployment of the airbag smooth and reliable.

Second, the airbag cushion is supported by a headliner in a reverse right-triangular shape. Therefore, the cushion can effectively absorb impact applied to the passenger and thus maintain the passenger in a stable position.

Third, when the airbag cushion is deployed, a depressed head support portion of the airbag cushion can maintain the head of the passenger in a stable position. Hence, the cushion can more effectively absorb the impact applied to the passenger when the cushion is deploying.

Fourth, the present invention can reduce impact applied to the head of the passenger when the airbag cushion is supporting the position of the passenger, thus minimizing injury to the passenger, and fundamentally preventing the neck of the passenger from being bent by the inflation pressure of the airbag cushion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the attached drawings.

Figure 1:
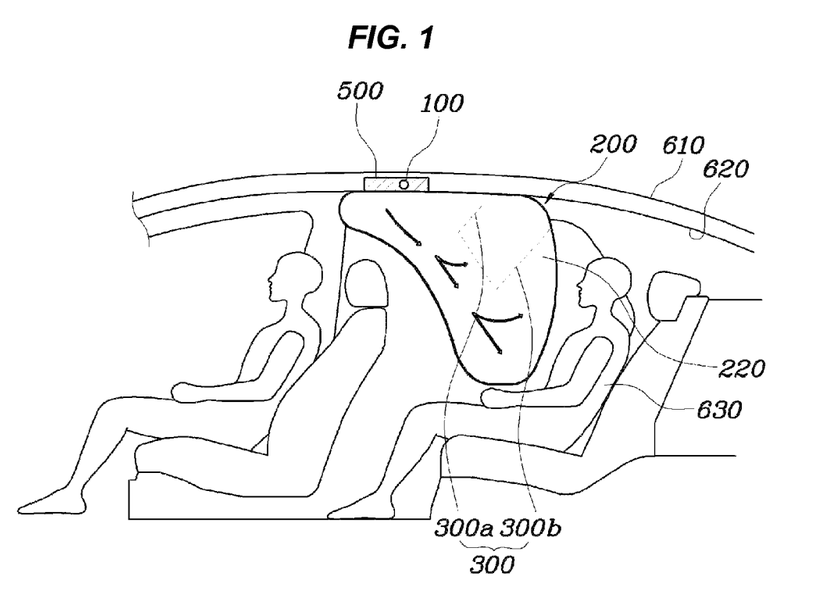
FIG. 1 is a view showing the structure of an airbag apparatus for vehicles, according to an exemplary embodiment of the present invention.
Figure 2:
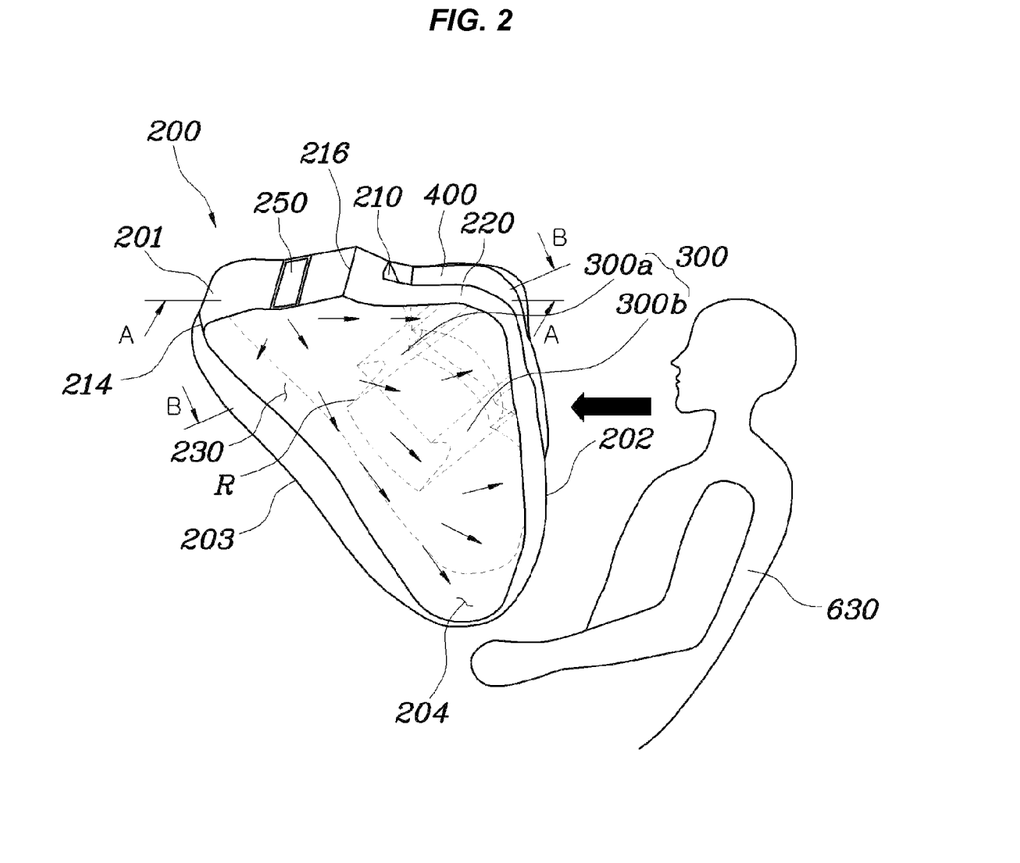
FIG. 2 is a view showing the structure of an airbag cushion of the airbag apparatus, according to an exemplary embodiment of the present invention.

As shown in FIGS. 1 and 2, in an airbag apparatus according to an exemplary embodiment of the present invention, a gas path 230 is formed in a front portion of an airbag cushion 200 such that the flow of gas is smooth. A depressed head support portion 210 is formed in a rear portion of the airbag cushion 200 to effectively absorb impact applied to the head of a passenger 630.

To achieve these purposes, the airbag apparatus includes an inflator 100, the airbag cushion 200 and a support tether 300.

The inflator 100 supplies gas into the airbag cushion 200 when a vehicle collision occurs. Preferably, the inflator 100 is installed in a housing 500 provided in space between a roof panel 610 and a headliner 620.

The housing 500 is a casing which contains the airbag cushion 200 therein. The inflator 100 is installed in a predetermined portion of the housing 500 to supply gas into the airbag cushion 200. Particularly, a lower surface of the housing 500 may be covered with the headliner 620 or, alternatively, it may be exposed out of the headliner 620 to the passenger compartment. In the case where the housing 500 is covered with the headliner 620, a tear line is provided on the headliner 620 to ensure deployment of the airbag cushion 200. In the case where the housing 500 is exposed to the passenger compartment through the headliner 620, an airbag door is provided in the lower surface of the housing 500 to ensure deployment of the airbag cushion 200.

In this embodiment, although the inflator 100 and the airbag cushion 200 have been illustrated as being installed in the housing 500 provided in the space between the roof panel 610 and the headliner 620, the inflator 100 and the airbag cushion 200 may be directly installed in the space between the roof panel 610 and the headliner 620 without a separate housing being used.

Figure 3:
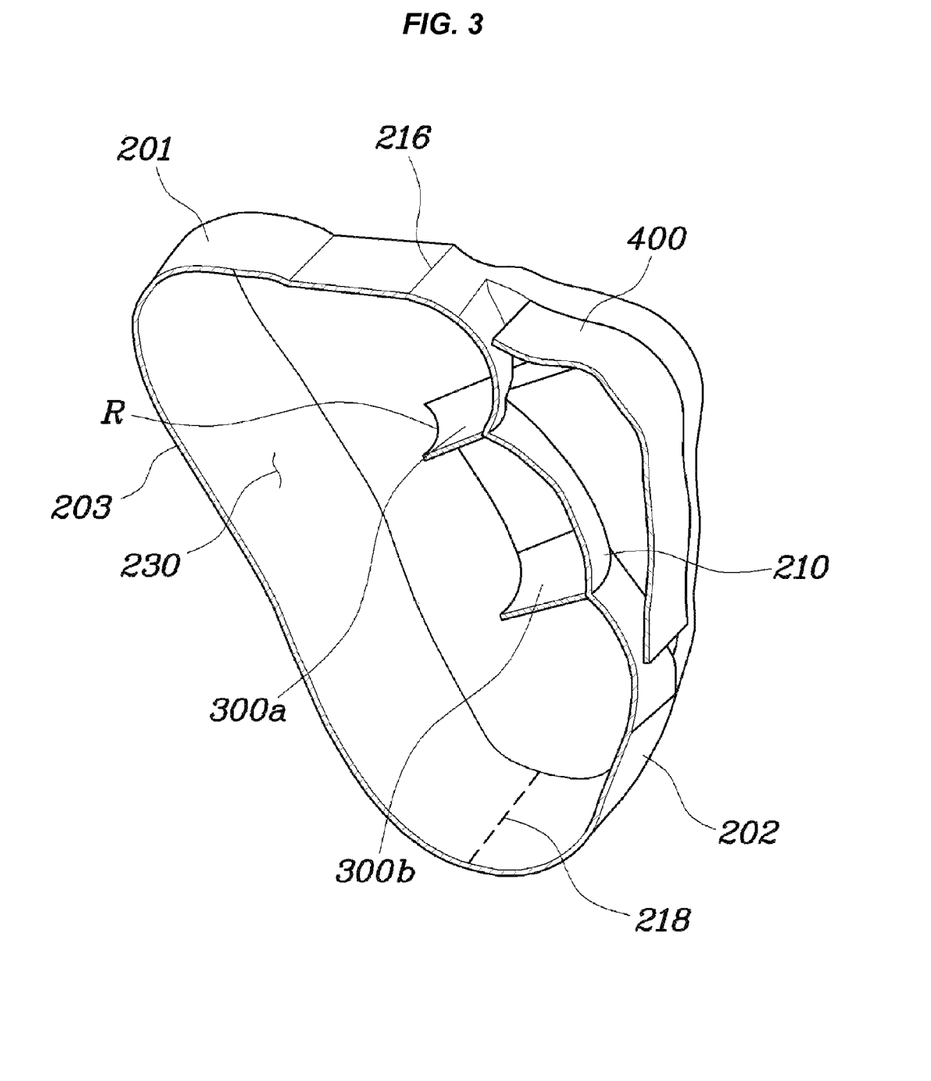
FIG. 3 is a longitudinal sectional view taken along the line A-A of FIG. 2.
Figure 4:
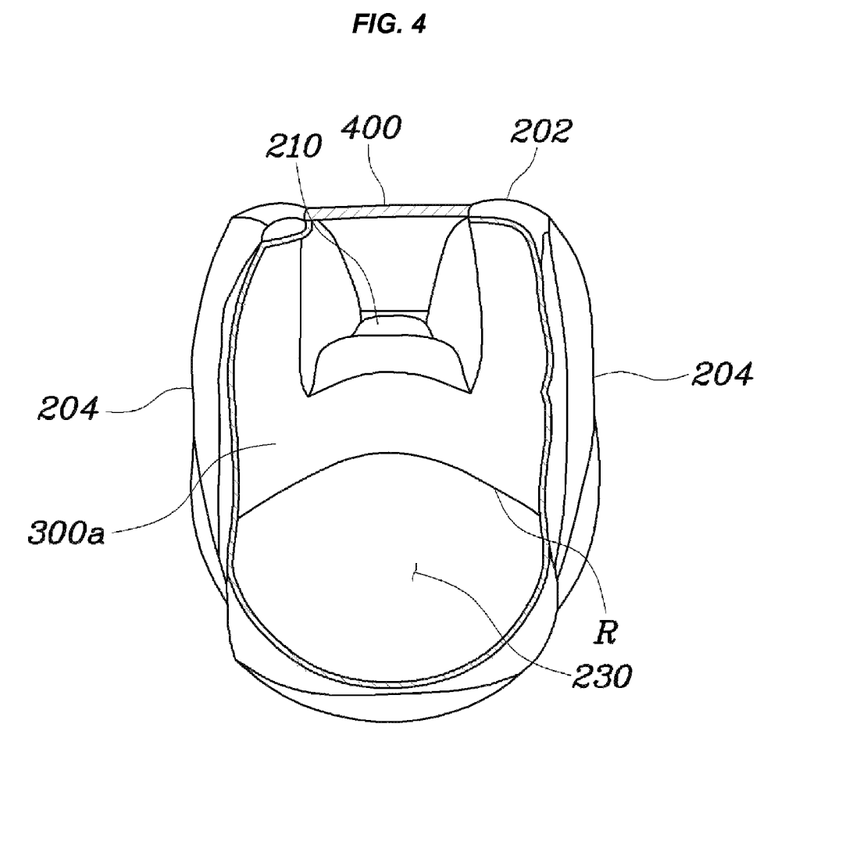
FIG. 4 is a cross-sectional view taken along the line B-B of FIG. 2.

As shown in FIGS. 3 and 4, when a vehicle collision occurs, the airbag cushion 200 is deployed downwards by gas supplied from the inflator 100 so as to protect the passenger 630. The airbag cushion 200 includes a roof support panel 201, a vertical support panel 202, a ramp support panel and side support panels 204 such that a gas inlet 250, the head support portion 210, the gas path 230 and shoulder support portions 220 are formed. Thereby, the airbag cushion 200 can minimize the impact applied to the head of the passenger 630 when it is deployed.

In detail, the roof support panel 201 is a support panel which is in contact with the headliner 620. The gas inlet 250 is formed in a predetermined portion of the roof support panel 201. When a vehicle collision occurs, gas is supplied from the inflator 100 into the entire space of the airbag cushion 200 through the gas inlet 250.

Furthermore, front and rear end lines of the roof support panel 201 are respectively connected to an upper end line 216 of the vertical support panel 202 and an upper end line 214 of the ramp support panel 203. Both side lines of the roof support panel 201 are connected to respective upper end lines of the side support panels 204.

The vertical support panel 202 forms the rear surface of the airbag cushion 200. The upper end line 216 of the vertical support panel 202 is connected to the rear end line of the roof support panel 201 such that the vertical support panel 202 is perpendicular to the roof support panel 201.

The ramp support panel 203 connects a front end line of the roof support panel to a lower end line 218 of the vertical support panel 201.

The vertical support panel 202 forms the head support portions 210 and the head support portion 210 is provided between the shoulder support portions 220.

The depressed head support portion 210 holds the head of the passenger 630 when a vehicle collision occurs. The head support portion 210 is formed in the rear portion of the airbag cushion 200 and has a depressed shape corresponding to the head of the passenger 630. Thus, when the airbag cushion 200 is deployed, the head of the passenger 630 is inserted into the head support portion 210, so that impact force applied to the head of the passenger 630 can be effectively absorbed by inflation force of the airbag cushion 200.

Particularly, the head support portion 210 is inclined downwards and rearwards such that the depth thereof is reduced from the top towards the bottom of the airbag cushion. The reason for this is to make the shape of the head support portion 210 correspond to the outline of the head and the neck of the passenger 630.

Thereby, the head support portion 210 can reliably protect the head and the neck of the passenger 630. The shoulder support portions 220 are disposed on opposite sides of the head support portion 210 and configured such that when the airbag cushion 200 is deployed, they protrude from the head support portion 210 towards the shoulders of the passenger 630. Thus, when the head of the passenger 630 is supported by the head support portion 210, the shoulders of the passenger 630 can be stably supported by the shoulder support portions 220.

The ramp support panel 203 forms the front surface of the airbag cushion 200. The upper end line of the ramp support panel 203 is connected to the front end line of the roof support panel 201 such that the ramp support panel 203 forms a predetermined angle with the roof support panel 201. The gas path 230 is defined in the airbag cushion 200 at a position adjacent to the ramp support panel 203. The gas path 230 forms a path between the ramp support panel 203 and the support tether 300 along which gas flows. Thereby, the flow of gas becomes smooth, and the time it takes for the airbag cushion 200 to be completely deployed is reduced, thus making it possible to deploy the airbag cushion 200 reliably and smoothly.

The side support panels 204 form the opposite sidewalls of the airbag cushion 200 and connect side edge lines of the roof support panel 201, the vertical support panel 202 and the ramp support panel 203 to each other.

The support tether 300 is provided in the airbag cushion 200 to maintain the entire shape of the airbag cushion 200.

The support tether 300 has a "U" shape. Rear and side edges of the support tether 300 are respectively connected to the rear surface and the sidewalls of the airbag cushion 200, in other words, the vertical support panel 202 and the side support panels 204, by sewing.

The support tether 300 includes an upper support tether 300a and a lower support tether 300b which are spaced apart from each other by a predetermined distance with respect to the vertical direction of the airbag cushion 200. Front edges of the upper and lower support tethers 300a and 300b have a round shape (R) to form the gas path 230 along which gas flows.

The airbag cushion 200 having the above-mentioned structure generally has a reverse right-triangular shape. The airbag cushion 200 having this shape can effectively absorb impact applied to the passenger 630 when a vehicle collision occurs.

Particularly, the front surface of the airbag cushion 200 is inclined and curved downwards and rearwards to prevent it from being impeded by the front seat when the airbag cushion 200 is being deployed. In detail, the front surface of the airbag cushion 200 has a shape corresponding to a track along which a head rest of the front seat moves when the front seat back is tilted forwards or rearwards. Thus, the airbag cushion 200 can be smoothly deployed without interruption.

Meanwhile, an airbag screen 400 is attached to the shoulder support portions 220 of the airbag cushion 200. The airbag screen 400 covers the head support portion 210. For example, for the case where the airbag screen 400 is attached to the shoulder support portions 220, the shoulder support portions 220 are supported relative to each other by the airbag screen 400. Thereby, the space between the shoulder support portions 220 can be prevented from widening to the left and the right. On the other hand, if no airbag screen is attached to the shoulder support portions 220, when the airbag cushion 200 is deployed, the space between the shoulder support portions 220 widens to the left and the right based on the head support portion 210, because the shoulder support portions 220 cannot be supported relative to each other.

Therefore, in an exemplary embodiment of the present invention, when the airbag cushion 200 is deployed by a vehicle collision, the face of the passenger 630 is covered by the airbag screen 400 and stably supported by the head support portion 210. Thereby, impact applied to the head of the passenger 630 can be effectively absorbed by the airbag cushion 200 while it is deploying.

As described above, in an exemplary embodiment of the present invention, when the airbag cushion 200 is deployed in the case of a vehicle collision, gas can smoothly flow in the front portion of the airbag cushion 200. Therefore, the time it takes the airbag cushion 200 to be completely deployed is reduced, thus making the deployment of the airbag smooth and reliable. Furthermore, the depressed head support portion 210 of the airbag cushion 200 holds the head of the passenger 630 at the initial stage of the deployment of the airbag cushion 200. Hence, the airbag cushion 200 can effectively absorb impact applied to the passenger 630.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus for a vehicle, comprising:
    an inflator; and
    an airbag cushion having:
        a depressed head support portion formed in a rear portion of the airbag cushion so that when the airbag cushion is deployed by gas supplied from the inflator, head support portion configured to receive a head of a passenger;
        shoulder support portions protruding from lateral sides of the head support portion in a rearward direction and forming a space between the shoulder support portions to have the head support portion therebetween when the airbag cushion is deployed; and
        a support tether provided in the airbag cushion and extending in a transverse direction across the shoulder support portions such that a gas is defined in a front portion of the airbag cushion below the support tether, the gas path guiding the gas downwards,
    wherein rear and side edges of the support tether are respectively connected to a rear surface of the head support portion and sidewalls of the airbag cushion by sewing so that the support tether encloses the head support portion, and
    wherein a front edge of the support tether is not connected to an inner surface of the airbag cushion and has a round shape.

2. The airbag apparatus as set forth in claim 1, wherein an airbag screen is attached to the shoulder support portions, the airbag screen covering the head support portion.

3. The airbag apparatus as set forth in claim 1, wherein the support tether connects the head support portion and inner surface of the airbag cushion.

4. The airbag apparatus as set forth in claim 3, wherein the support tether comprises an upper support tether and a lower support tether spaced apart from each other by a predetermined distance in a vertical direction of the airbag cushion.

5. The airbag apparatus as set forth in claim 1, wherein the front edge of the support tether has a convex shape protruding along the gas path defined by the gas supplied from the inflator.

6. The airbag apparatus as set forth in claim 1, further comprising:
    a housing provided in a space between a roof panel and a headliner of the vehicle, the housing containing the airbag cushion.

7. The airbag apparatus as set forth in claim 6, wherein the airbag cushion comprises:

a roof support panel supported by the headliner and receiving the gas through a gas inlet formed thereon;

a vertical support panel perpendicularly connected at an upper end line thereof to a rear end line of the roof support panel;

a ramp support panel connecting a front end line of the roof support panel to a lower end line of the vertical support panel at an inclined angle; and side support panels connecting side edge lines of the roof support panel, the vertical support panel, the ramp support panel, and the support tether.

* * * * *